United States Patent [19]

Dickinson

[11] Patent Number: 5,030,505

[45] Date of Patent: Jul. 9, 1991

[54] POLYARYLATE-POLYETHYLENE COMPOSITE LAMINATED STRUCTURES

[75] Inventor: Barry L. Dickinson, Whitehouse Station, N.J.

[73] Assignee: Amoco Corporation, Chicago, Ill.

[21] Appl. No.: 485,979

[22] Filed: Feb. 27, 1990

Related U.S. Application Data

[62] Division of Ser. No. 190,381, May 5, 1988, Pat. No. 4,931,364.

[51] Int. Cl.$^5$ .............................................. B32B 7/02
[52] U.S. Cl. .................................... 428/215; 428/213; 428/483; 428/522
[58] Field of Search ................ 525/240; 428/483, 516, 428/213, 215, 522

[56] References Cited

U.S. PATENT DOCUMENTS 4,705,707 10/1987 Winter .................................. 428/516

Primary Examiner—Edith Buffalow
Attorney, Agent, or Firm—Matthew R. Hooper; William H. Magidson; Ralph C. Medhurst

[57] ABSTRACT

Composite laminated structures comprising a polyarylate film bound to a polyethylene film via an intermediate tie layer are described. The structures are fabricated by coextrusion of three layer blown tubular films with the center layer being present to bond the polyethylene to the polyarylate.

9 Claims, No Drawings

POLYARYLATE-POLYETHYLENE COMPOSITE LAMINATED STRUCTURES

This is a division of application Ser. No. 190,381, filed May 5, 1988 now U.S. Pat. No. 4,931,364.

FIELD OF THE INVENTION

Composite laminated structures comprising a polyarylate film bound to a polyethylene film via an intermediate tie layer are described. The structures are fabricated by coextrusion of three layer blown tubular films with the center layer being present to bond the polyethylene to the polyarylate. The composition of the center material is critical if good adhesion and clarity are desired.

The instant composite films display good mechanical properties and excellent UV resistance. They are useful in a variety of outdoor applications such as, for example, covering for greenhouses.

When the tie layer is omitted coextrusion yields laminates which can be separated into the constituents polyethylene and polyarylate. The technique is general and is a means of extruding very thin engineering polymer films, now achievable only via solution casting.

BACKGROUND OF THE INVENTION

Polyarylates are aromatic polyesters derived from dihydric phenols and aromatic dicarboxylic acids. The material based on 2,2-bis(4-hydroxyphenyl)propane (bisphenol-A) and a 50:50 mixture of terephthalic and isophthalic acids (1) is offered commercially by Amoco Performance Products, Inc. under the tradename of ARDEL® D-100.

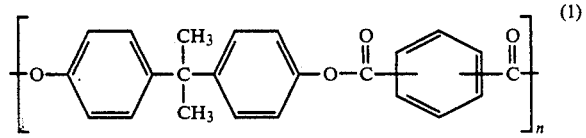
(1)

Polyarylates are high temperature, high performance thermoplastic polymers with a good combination of thermal and mechanical properties. They display excellent UV resistance and have good processibility which allows them to be molded into a variety of articles.

It is known that upon exposure to ultraviolet light polyarylates undergo the Photo-Fries rearrangement. Korshak et al., in Synthesis and Properties of Self-Protecting Polyarylates, Journal of Polymer Science, Part A-1, Vol.7, pages 157 to 172 (1969) describe a mechanism to explain what happens when polyarylates are exposed to UV light. The authors propose that polyarylates undergo the Photo-Fries rearrangement resulting in carbonyl and hydroxyl groups ortho to one another, structurally similar to o-hydroxybenzophenones which are known light absorbers. Thus, the polyarylates have increased photostability in the bulk of the material.

Cohen et al., in Transparent Ultraviolet-Barrier Coatings, Journal of Polymer Science, Part A-1, Vol. 9, pages 3263 to 3299 (1971) describe a number of phenyl polyesters, including polyarylates, which were synthesized to furnish molecules whose backbones rearrange under UV light to an o-hydroxybenzophenone structure. This Photo-Fries rearrangement -produced ultraviolet opacity in an irradiated film while maintaining visual transparency. Thin coatings of these polyesters completely protected substrates ordinarily sensitive to ultraviolet light. The authors state that spectroscopic analysis of various rearranged films and coatings showed that the o-hydroxybenzophenone polymer formed was concentrated at the irradiated surface of the original polyester coating as a "skin". Such a skin, formed in situ during the irradiation, functioned to protect both the original polyester coating as well as the coated substrate from degradation by ultraviolet irradiation. Furthermore, a significant "healing" mechanism appeared inherent in the coatings, for as the exposed skin ultimately degraded under extended ultraviolet irradiation, more of the underlying polyester layer apparently rearranged to compensate for the loss. Thus, the clear coating functioned both as a protective skin and a rearrangeable reservoir.

U.S. Pat. No. 3,492,261 describes film forming solutions of rearrangeable aromatic polyesters which are the polymeric reaction product of an aromatic dihydric compound and an aromatic dicarboxylic compound. It is stated in this patent that the preferred dihydric compounds are the ester derivatives of 4,4-bis(4'-hydroxyphenyl)pentanoic acid. The solutions of aromatic polyesters can be coated onto a substrate and dried to transparent films; they are capable of absorbing ultraviolet light and undergo rearrangement in the presence of the substrate to form a transparent compound which is stable to and will act as a barrier to ultraviolet light.

U.S. Pat. No. 3,503,779 discloses substrates which are coated with rearrangeable aromatic polyesters which are the polymeric reaction product of an aromatic dihydric compound and an aromatic dicarboxyl compound. The outer exposed surface of the aromatic polyester coatings rearrange under the influence of ultraviolet light to form a new transparent compound which is stable to and will act as a barrier to ultraviolet light.

U.S. Pat. No. 3,444,129 discloses rearrangeable aromatic polyesters which are the polymeric reaction product of an aromatic dihydric compound, and an aromatic dicarboxylic compound. The preferred dihydric compound is stated to be the ester derivatives of 4,4-bis(4'-hydroxyphenyl) pentanoic acid. The rearrangeable aromatic polyesters are useful as ultraviolet light barriers.

U.S. Pat. No. 3,460,961 describes substrates which are protected with a transparent aromatic polyester coating of two contiguous superposed layers. The aromatic polyester compounds are the reaction product of an aromatic dihydric compound and an aromatic dicarboxylic compound. The aromatic polyester coating undergoes rearrangement in the presence of ultraviolet light to form a transparent compound which is stable to and acts as a barrier to ultraviolet light.

However, in all of these references coatings are being utilized which, as discussed above, require expensive solvent coating equipment and require evaporation of a solvent.

U.S. Pat. No. 4,503,121 describes laminate compositions comprising a polyarylate, or blends thereof, derived from a dihydric phenol and an aromatic dicarboxylic acid which is laminated upon the surface of a poly(aryl ether), particularly polysulfone. It is stated therein that excellent protection is afforded the polysulfone against degradation resulting from prolonged UV exposure by laminating the polyarylate upon its surface.

Similarly, laminates formed from a layer of a polyarylate sheet and a layer of an aromatic polycarbonate, a polyester, or mixtures of these resin sheets, useful in glazing applications, are described in U.S. Pat. No. 4,643,937.

Blends containing polyarylates and polyolefins are known and are discussed in U.S. Pat. No. 4,281,079 and in U.S. patent application Ser. No. 887,434; filed on July 21, 1986 in the names of L. M. Robeson et al., titled "Blends of a Very Low Density Ethylene Polymer or Copolymer with Polyarylates and/or Polycarbonates", commonly assigned. Note that polyolefin/polyester blends have been melt-extruded into shaped articles such as filaments or films - see U.S. Pat. No. 3,534,120.

It is known that low density ($\leq 0.94$ g/cm$^3$) polyethylenes and EVA-modified polyethylene films are widely used as covering for greenhouses. Although UV absorbers are incorporated into the resins, the useful life of such films is usually one to two years in Florida-California outdoor exposure. Hence, laminate structures of polyarylates, which display outstanding weatherability characteristics, with polyethylenes, in which the latter would be protected against UV irradiation by a thin layer of the aromatic polyester, were deemed of utmost importance and practical interest. Such multilayer films are the subject of the instant invention.

THE INVENTION

In the instant invention it has been found that a sheet made from low density polyethylene (d$\leq$0.94 g/cm$^3$) or from a polyethylene copolymer can be protected from ultraviolet light by laminating thereon a sheet made from a polymer which undergoes a Photo-Fries rearrangement such as a polyarylate, onto one or both of its surfaces. As compared to the prior art methods which utilize a coating to protect a substrate against UV light, the present invention does not have the disadvantage of solvent removal. Also, this invention provides permanent protection to the underlying surface as compared to a coating which can wear off. It was found that an appropriate tie layer is required to ensure proper adhesion between the polyethylene and the polyarylate. The nature of the tie layer is important both with respect to adhesion and to the clarity of the laminated film. The instant composite films display good mechanical properties and excellent UV resistance. They are useful in a variety of outdoor applications such as, for example, covering for greenhouses.

Specifically, the instant invention comprises a laminate of low density polyethylene polymer or copolymer, an appropriate tie layer, and a polyarylate, a polyarylate blend, or a polyarylate copolymer. A preferred laminate comprises a layer where the polyarylate is derived from bisphenol-A and isophthalic and terephthalic acids.

The components of the laminated films have the following thicknesses:

- the low density polyethylene polymer or copolymer from about 2 to about 100 mils, preferably from about 4 to about 10 mils;
- the polyarylate, the polyarylate blend, or the polyarylate copolymer - from about 0.1 to about 4.0 mils, preferably from about 0.5 to about 2.0 mils;
- the tie layer - from about 0.3 to about 1.0 mils preferably from about 0.3 to about 0.8 mils.

The polyarylates useful in the instant invention are based on (a) at least one dihydric phenol of the formula

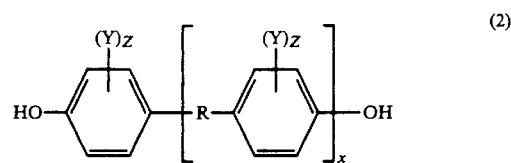

where Y is independently selected from alkyl groups of 1 to 4 carbon atoms, chlorine or bromine; Z independently has a value of from 0 to 4, inclusive, and R is independently selected from a divalent $C_6$ to $C_{20}$ aromatic or saturated aliphatic or cycloaliphatic hydrocarbon radical, particularly alkylene or alkylidene radicals having from 1 to 8 carbon atoms, especially $C(CH_3)_2$, cycloalkylene, or cycloalkylidene radicals having up to and including 9 carbon atoms, O, S, SO, $SO_2$, CO and a chemical bond, x is 0 or 1; and b) at least one aromatic dicarboxylic acid.

The dihydric phenols that may be used in this invention include the following:

2,2-bis(4-hydroxyphenyl)propane,
bis-(2-hydroxyphenyl)methane,
bis-(4-hydroxyphenyl)methane,
bis-(4-hydroxy-2,6-dimethyl-3-methoxyphenyl)methane,
1,1-bis(4-hydroxyphenyl)ethane,
1,2-bis(4-hydroxyphenyl)ethane,
1,1-bis-(4-hydroxy-2-chlorophenyl)ethane,
1,1-bis-(3-methyl-4-hydroxyphenyl)ethane,
1,1-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)-1,2-bis-(phenyl)-propane,
4,4'-(dihydroxyphenyl)ether,
4,4'-(dihydroxyphenyl)sulfide,
2,2-bis-(4-hydroxy-3,5-dichlorophenyl)propane,
4,4'-(dihydroxyphenyl)sulfone,
4,4'-(dihydroxyphenyl)sulfoxide,
4,4'-(dihydroxybenzophenone), and 4,4'-biphenol.

In addition, diphenols such as hydroquinone, and the naphthalene diols are also useful.

These dihydric phenols may be used individually or in any combination which when reacted with an aromatic dicarboxylic acid or mixtures thereof produces polyarylate polymers and copolymers that are soluble in inert organic solvents as hereinbelow defined. The preferred dihydric phenol is 2,2-bis(4-hydroxyphenyl)-propane.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl groups contain from 1 to about 4 carbon atoms, and acids containing other inert substituents such as halides, alkyl or aryl ethers, and the like. Preferably, mixtures of isophthalic and terephthalic acids are used. The isophthalic acid to terephthalic acid ratio in the mixture is about 20:80 to about 100:0. while the most preferred acid ratio is about 25:75 to about 50:50. Also, from about 0.5 to about 20 mole percent of aliphatic diacids containing from 2 to about 10 carbon atoms, such as adipic acid, sebacic, and the like may be additionally used in the polymerization reaction.

The polyarylates may be prepared using any of the methods known in the art. These include:

(a) The acid chloride route

In this route the polyarylate is obtained via the reaction of an aromatic diacid chloride with dihydric phenol. Two procedures are useful. One is carried out at low temperature and the other at high temperature. In the low temperature technique, polycondensation of the aromatic acid chloride with the dihydric phenol is effected at ambient temperatures in an inert solvent, such as methylene chloride, in the presence of a basic catalyst and an acid acceptor. This type of process is described in, for example, U.S. Pat. No. 3,234,168. The condensation may also be performed in the presence of an inorganic acid acceptor, such as $Ca(OH)_2$ suspended in an inert organic solvent, as described in U.S. Pat. No. 3,939,117. A second immiscible solvent, e.g., water, may be present in these low-temperature reactions. This process variant is referred to as the interfacial or phase boundary polymerization. In the interfacial reaction the phenolic components are dissolved in an aqueous alkaline phase. Small quantities, e.g., 0.1 to 1.0 percent by weight (based on the phenolic materials used) of reducing alkaline substances, such as sodium bisulfite for example, may be added to the aqueous phase. Quarternary ammonium or phosphonium compounds, in amounts ranging from about 0.5 to about 5.0 mole percent based on the phenolic components, may be used as the polymerization catalysts. The acid chlorides are dissolved in the organic solvent and the solution is brought into contact with the aqueous alkaline solution which contains the phenolates. The two phases are vigorously stirred and polymer formation occurs at the interface. Preferred solvents for the low-temperature polymerization include methylene chloride, chloroform, tri- and tetrachloroethylene, tetrachloroethane, chlorobenzene, dichlorobenzene, tetrahydorfuran, and mixtures of these solvents. Temperatures are generally in the range of from about 0° to about 40° C., preferably in the range of from about 15° to about 30° C.

The high-temperature acid chloride process involves the condensation reaction at elevated temperatures (>100° C.) in high boiling solvents. The reactions may be performed in the absence of catalysts, in which case temperatures in excess of 200° C. are preferred. The polycondensations may also be catalyzed, for example with magnesium, as described in U.S. Pat. No. 3,733,306 and by Matzner and Barclay, Journal of Appl. Polymer Science, Vol. 9, pp 3321-3336 (1965). Another class of catalysts are, for example, the titanate esters described in German Patent Application No. 1,933,657. Lower temperatures are satisfactory for the catalyzed reactions and are generally in the range of about 110° C. to about 220° C., although higher temperatures may be necessary in some instances.

Inert, high boiling solvents which can be used in the high temperature process are those that do not react with the starting materials or with the final polyester. Also, the solvents should dissolve the polyarylate formed. Representative solvents include the chlorinated aromatic hydrocarbons such as chlorobenzene, dichloro-, trichloro-, and tetrachlorobenzenes, chlorinated biphenyls or diphenyl ethers, chlorinated naphthalenes; as well as non-chlorinated aromatics such as anisole, nitrobenzene, ditolymethane, terphenyl, benzophenone, the dibenzylbenzenes, and the like.

(b) The diacetate process

The diacetate process consists in the reaction of aromatic diacids with diesters of the dihydric phenols, i.e., derivatives of the formula

$$R_1-COOArOCOR_1$$

where $R_1$ is, for example, a $C_1$ to $C_{10}$ aliphatic group, and Ar is the residuum of the dihydric phenol. Thus, the polymerizations using the diacetate process require first the preparation of a diester of the dihydric phenol with a monocarboxylic acid. In principle, any monocarboxylic acid can be used; aliphatic acids containing from two to eleven carbon atoms are preferred; most preferred are $C_2$ to $C_4$ aliphatic acids. The esters (3) are then reacted under acidolysis conditions with the dicarboxylic acid or mixtures of dicarboxylic acids; the reaction yields the polyarylate and the monocarboxylic acid, which can be recycled. The two steps, i.e., the preparation of the monocarboxylic acid esters (3), and their polymerization, can be performed separately, or in a one-pot procedure. It is preferred that the intermediate diesters contain ≦ than about 1,500 parts per million of residual acid anhydride prior to polymerization. This procedure, as described in U.S. Pat. No. 4,321,355, yields polyarylates having good color and melt-stability. The acidolysis reaction can be performed in bulk or in the presence of a processing aid. The preferred processing aids are a diphenyl ether compound as described in U.S. Pat. Nos. 4,294,956 and 4,296,232; a cycloaliphatic substituted aromatic or heteroaromatic compound as described in U.S. Pat. No. 4,294,957; and a halogenated and/or etherated substituted aromatic or heteroaromatic compound as described in U.S. Pat. No. 4,374,239. The polymerization reaction can also be conducted using a slurry process as described in U.S. Pat. No. 4,083,829.

The acidolysis reactions are carried out in the temperature range of about 200° C. to about 350° C.; preferably in the temperature range of about 250° to about 325° C. However, lower and higher temperatures may also be used. The reactions can be carried out at atmospheric or subatmospheric pressures; they can also be performed under pressures higher than atmospheric.

The acidolysis reaction generally does not require a catalyst. In some instances, however, the use of an appropriate catalyst may prove advantageous. Typical catalysts include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts, such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

(c) The diphenate process

The third basic polyarylate process, referred to as the diphenate route, consists in reacting a diaryl ester of an aromatic diacid, for example, (4), with a dihydric phenol. In formula (4)

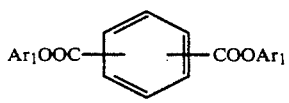 (4)

Ar₁ is a monovalent radical. The reaction yields the polyarylate and the phenol Ar₁OH, which can be recycled. The group Ar₁ can be derived from any phenol; phenyl or tolyl groups are preferred.

The polymerization is essentially an ester-interchange reaction; the two steps, i.e., the preparation of (4) and their polymerization, may be performed separately or in a one-pot procedure.

The ester-exchange reaction can be performed in bulk or in the presence of a processing aid. The preferred processing aids are a diphenyl ether compound, a cycloaliphatic substituted aromatic or heteroaromatic compound, or a halogenated and/or etherated substituted aromatic or heteroaromatic compound as described in, for example, U.S. Pat. No. 4,459,384.

It is most preferred to use the diphenyl iso- and terephthalates. The ester-exchange reaction is generally carried out in the temperature range of 200° to about 350° C. However, lower or higher temperatures may be used. The reaction can be performed at atmospheric, reduced, or higher than atmospheric pressures. Catalysts, generally compounds containing metals such as alkali and alkaline earth metals, cerium, manganese, cobalt, zinc, germanium, tin, antimony and bismuth, may be used to accelerate the polymerization. Examples of typical catalysts are the alkali metal phenoxides, hydroxides, and alkoxides.

Useful polyarylates have a reduced viscosity of from about 0.4 to greater than about 1.0, preferably from about 0.5 to about 0.8 dl/g as measured in chloroform (0.5 g/100 ml. chloroform) or other suitable solvent at a suitable temperature.

Note, that in addition to polyarylates per se, one may also use their blends with other polyesters, such as poly(ethylene terephthalate) and other poly(alkylene phthalates). Heating of said blends results in ester-interchange of the components and formation of polyarylate-poly(alkylene phthalate) copolymers. Such copolymers are also useful for the purposes of the instant invention.

Another class of polyarylate copolymers that may be employed are the poly(arylate-carbonates). These are described in, for example, U.S. Pat. No. 3,169,121, herein incorporated by reference. Such copolyesters comprise recurring carbonate groups

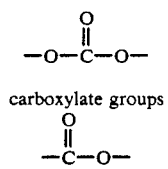

carboxylate groups $$-\overset{O}{\underset{\|}{C}}-O-$$

and aromatic carbocyclic groups in the linear polymer chain, in which at least some of the carboxylate groups and at least some of the carbonate groups are bonded directly to ring carbon atoms of the aromatic carbocyclic groups. The copolyesters are prepared by reacting, as essential ingredients, a difunctional carboxylic acid, a difunctional phenol, and a carbonate precursor, methods for preparing the copolyesters being well known, and disclosed in U.S. Pat. Nos. 3,030,331 and 3,169,121, among others. These copolyesters comprise at least two of the following four recurring units in their linear chain.

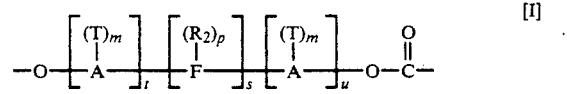 [I]

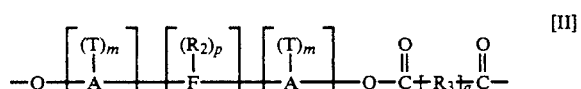 [II]

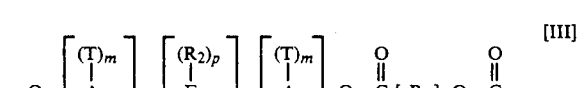 [III]

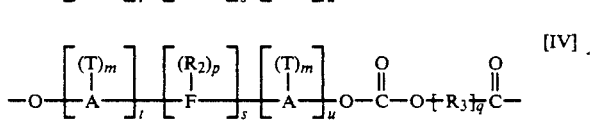 [IV]

wherein A and $R_3$ are independently aromatic groups such as phenylene, biphenylene, naphthylene, anthracenylene, and the like;

F may be an alkylene, cycloalkylene, alkylidene or cycloalkylidene group such as methylene, ethylene, propylene, propylidene, isopropylidene, butylene, butylidene, amylene, isoamylene, amylidene, isoamylidene, cyclyhexylene, cyclohexylidene, and the like;

$R_2$ is hydrogen, alkyl, cycloalkyl, aryl, and the like;

T is an inorganic atom such as chlorine, bromine, or fluorine, an inorganic group such as nitro, an organic group such as $R_2$ above, or any alkoxy group such as $OR_2$, it being only necessary that T be inert to and unaffected by the reactants and reaction conditions;

m is any whole number from and including zero through the number of positions available on A for substitution;

p is any whole number from and including zero through the number of available positions on F;

q is a whole number equal to at least one.

s is either zero or one;

t is a whole number equal to at least one; and u is any whole number including zero.

Examples of dihydric phenols useful in making polyestercarbonates include all of those mentioned in connection with making polyarylates, supra.

The carboxylic acids useful in making polyestercarbonates include:

saturated, aliphatic dibasic acids derived from straight chain paraffin hydrocarbons such as oxalic, malonic, dimethyl malonic, succinic, glutaric, adipic, pimelic, suberic, azelaic, and sebacic acid, and halogen-substituted derivatives thereof;

aliphatic carboxylic acids containing hetero atoms in their aliphatic chain, such as thio-diglycolic or diglycolic acid;

unsaturated acids such as maleic or fumaric;

aromatic and aliphatic-aromatic dicarboxylic acids such as phthalic, isophthalic, terephthalic, homophthalic, o-, m-, and p-phenylene diacetic acid, and polynuclear aromatic diacids (e.g. naphthalene dicarboxylic).

hydroxy acids including aliphatic hydroxy acids such as hydroxybutyric, glycolic, and lactic acid, aliphatic-aromatic hydroxy acids such mandelic and o, m, and p-hydroxybenzoic acid; and long chain fatty acids such as 12-hydroxystearic acid;

cycloaliphatic acids including tetrahydrophthalic, tetrahydroterephthalic, tetrahydroisophthalic, and the like.

A preferred polyester carbonate results from the condensation of phosgene, terephthaloyl chloride, isophthaloyl chloride with bisphenol-A and a small amount of p-tert-butylphenol as the chain terminator.

The polyestercarbonates should contain at least 50 mole percent of polyarylate groups. Their reduced viscosities are generally in the range that was found to be useful for polyarylates.

By the term polyolefin are meant homo- and copolyethylenes having a density of $\leq 0.94$ g/cm$^3$. The materials include:

conventional low density polyethylene (LDPE) made under high pressure;

LDPE copolymers incorporating other $\alpha$-olefins polyethylene/vinyl acetate copolymers;

linear low density polyethylene (LLDPE) which include copolymers of ethylene with one or more of propylene, butene, hexene, 4-methyl pentene-1, octene-1, and other unsaturated aliphatic hydrocarbons. The materials have a density range of 0.91–0.94 g/cm$^3$ and a melting peak range of 100°–135° C. These LLDPE resins are generally prepared using transition metal catalysts such as compounds of titanium, aluminum, chromium and the like. Note that these LLDPE resins are different from conventional LDPE materials. Thus, because of the methods by which low density polyethylenes (LDPE) are prepared, they are highly branched materials which have a tendency to coil on themselves. The linear low density materials, on the other hand, as their name indicates, have very little of this long-chain branching and have on the backbone just short chain-branches introduced by the use of a comonomer; and very low density ethylene copolymers. These materials, having a density of between about 0.855 and about 0.910 g/cm$^3$ are described in European Patent Application No. 120,503 published on Oct. 3, 1984. The olefins which can be polymerized with ethylene to produce the low density, low modulus copolymers can contain from 3 to 8 carbon atoms. These $\alpha$-olefins should not contain any branching on any of their carbon atoms closer than two carbon atoms removed from the double bond. Suitable $\alpha$-olefins include propylene, butene-1, pentene-1, hexene-1, 4-methylpentene-1, heptene-1, and octene-1. The preferred $\alpha$-olefins are propylene, butene-1, hexene-1, 4-methylpentene-1 and octene-1.

These ethylene polymers and copolymers may be produced by the process described in said European Patent Application No. 120,503, which process comprises continuously contacting, in a fluidized bed, at a temperature of from 30° C. up to 80° C., a gaseous mixture containing (a) ethylene or ethylene and at least one higher $\alpha$-olefin in a molar ratio of such higher $\alpha$-olefin to ethylene of from 0.35:1 to 1, and (b) at least 25 mole percent of a diluent gas, with a catalyst composition prepared by forming a precursor composition from a magnesium compound, titanium compound, and electron donor compound; diluting said precursor composition with an inert carrier; and activating the diluted precursor composition with an organoaluminum compound.

The low density polyethylene homo- and copolymers generally have melt-indices in the range of 0.5 to 5.0 g/10 minutes, as measured using ASTM test D-1238, at 190° C. under 44 psi pressure. Melt index values in the range of from about 1 to about 2 g/10 minutes are preferred.

The most critical component of the laminated film structure is the tie layer. The latter, when properly chosen, ensures both a good adhesion of the polyolefin to the polyarylate and good clarity. Several known tie polymers were investigated. It was found that only two resins gave the desired performance. The first, marketed by Mitsui Chemical Company under the tradename of ADMER AT 469 ®, is a material based on maleic acid modified waxy ethylene polymers as described in U.S. Pat. No. 3,892,717. According to the subject patent the resins are prepared by polymerizing ethylene in the presence of hydrogen, using as a catalyst a halogen compound of titanium and/or vanadium supported on a carrier composed of a hydrocarbon-insoluble magnesium-containing compound and an organoaluminum compound, the amount of hydrogen being 3 to 90 molar percent of the vapor phase in the polymerization vessel, except the vapor portion of the solvent, and oxidizing and modifying the waxy ethylene polymer by reaction with a maleic acid compound. The term "waxy" is defined in the subject patent as a waxy substance that has a softening point (determined by the ring and ball test in accordance with JIS K-2531) of 80° to about 135° C., a melt viscosity at 140° C. of 1 to 10$^5$ centipoises, a hardness of 0 to 50, (determined by penetration in accordance with JIS K-2530), a density of 0.85 to 0.98 g/cm$^3$, and a viscosity average molecular weight (the viscosity of the polymer being measured at 135° C. using decalin as a solvent, and then calculated by the formula $M_v = 2.51 \times 10^4 [\eta]1.235$) of 400 to 2,000.

Furthermore, the degree of oxidation of the wax required for satisfactory reactivity with the maleic acid compound must be such that the oxygen content of the oxidized material be in the range of 0.1 to 1 percent by weight. Most of the bound oxygen is in the form of peroxide. Oxidation temperatures range from above the melting point of the polyethylene to about 140° C. To promote the oxidation, 0.1 to 1 percent by weight of an organic peroxide may be added.

The term "maleic acid compound" comprises maleic acid, maleic anhydride and the C$_1$ to C$_8$ dialkyl esters of maleic acid. The degree of grafting is such that the oxygen content of the final material is in the range of from about 0.1 to about 5.0 percent by weight, preferably in the range of from about 0.5 to about 2.0 percent by weight.

The excellent performance obtained with ADMER was surprising. Thus, two resins, very similar to ADMER, namely those available from the Chemplex Company of Rolling Meadows, Ill., under the tradenames of PLEXAR 3026 ® and PLEXAR PX-3 ® gave either a good bond, but a hazy laminate; or good clarity with fair adhesion only. PLEXAR resins are based on blends disclosed in U.S. Pat. Nos. 4,087,587 and 4,087,588. The subject blends comprise a polyolefin component and high density polyethylene (HDPE) grafted with an unsaturated fused ring carboxylic acid anhydride. The polyolefin component of the blend may include a number of resins such as high, low and medium density polyethylene and polyolefin copolymers such as ethylene/vinyl acetate copolymers and ethylene/acrylic acid copolymers.

The second tie layer material which gave good results was BYNEL CXA 3101 ® sold by the Dupont Company. The BYNEL CXA series (coextruded adhesive) are maleic anhydride functionalized ethylene-vinyl acetate copolymers. The CXA 3000 series generally have melt index values in the range of 0.8 to 2.5 g/10 minutes and display Vicat Softening Points of 60° to 83° C. - see, Digest of Polymer Developments, Polyolefins, Series 1, No.42, January 1987, pp 70–71, published by Springborn Laboratories, Inc., Enfield, Conn. In view of the poor performance of the PLEXAR materials, the good adhesion and transparency achieved with the BYNEL resin were again quite surprising and unexpected.

It is of interest to note that coextrusion of polyarylate and polyethylene without a tie layer yields a composite film which can be easily separated into the two component layers. Thus, high quality, very thin ($\approx 0.0001$ inch) films of polyarylate can be prepared via this novel technique. The technique is general and can be applied to the preparation of thin films from polyarylates, polyarylate blends and polyarylate copolymers, as well as films from a variety of other engineering polymers such as in particular poly(aryl ethers), poly(aryl ether sulfones), polycarbonates, poly(arylate-carbonates), poly(arylate-alkylene phthalates), poly(ether-imides) and poly(alkylene phthalates). It should be noted that the polyolefin acts here as a carrier; after separation of the engineering polymer layer, the polyethylene can be reground and recycled. It is also important to point out that in addition to low density ethylene polymers and copolymers, one can use other polyolefins such as the medium and high density polyethylenes, polypropylene, poly(1-butene) and the like. The preparation of thin films from engineering polymers is generally quite difficult; with amorphous or with soluble polymers, tedious and expensive casting techniques are necessary to accomplish the task. Thin films find a variety-of uses; thus, thin poly(aryl ether sulfone) films are useful in applications such as high temperature capacitors.

The laminate may be prepared by the procedure and using the apparatus as described in U.S. Pat. No. 3,557,265. In the method of said patent, film or sheet having a plurality of layers is formed by deforming a flowing stream having layers of diverse thermoplastic material wherein the cross-sectional configuration of the plurality of flowing streams is altered by reducing the dimension of the stream in a direction generally perpendicular to the interfaces between the individual streams and by increasing the dimension of the stream in a direction generally parallel to the interface to provide a sheet having a laminar structure.

In another method two or more previously extruded sheets are brought together under pressure and temperature conditions or in the presence of adhesives in order to obtain adherence of the sheets to one another.

Coextrusion offers the least expensive means of preparing the laminate. Within coextrusion, three different techniques are most often employed. In one of these techniques, two or more sheets are extruded from separate extruders through separate sheet dies into contact with one another while still hot and then passed through a single set of rollers or another extrusion die and down a single sheet line. Another coextrusion technique employs an adaptor or other means of bringing two or more different plastic materials from two or more extruders into contact with one another prior to their passage through an extrusion die. A further coextrusion technique is where two or more polymer melts meet in an extrusion die to form a laminate. Coextrusion is the preferred technique for forming the laminates of this invention.

The laminate may be formed into a shaped article such as a lens, a globe, and the like. If the laminate is to be used as a window, the laminate may be coated with a mar resistant coating.

EXAMPLES

The following examples serve to give specific illustrations of the practice of this invention but they are not intended in any way to limit the scope of this invention.

The following designations used in the examples have the following meaning:

Polyarylate: a blend of 60 parts by weight of the polyarylate of formula (1)

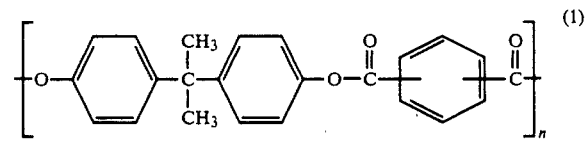

wherein (1) has a reduced viscosity in the range of from about 0.5 to about 0.65 dl/g as measured in p-chlorophenol, at a concentration of 0.2 g/100 ml. of solvent, at 49° C., and wherein the ratio of terephthalic acid to isophthalic acid units in (1) is 1:1, with 40 parts by weight of poly(ethylene terephthalate).

Natural Polyethylene: LDPE having a melt index of about 1 to about 2 g/10 minutes as measured at 190° C., under 44 psi pressure using the method of ASTM test D-1238.

Polyethylene USI NA 235-75: - low density polyethylene containing 4 percent of vinyl acetate.

Tie polymers used were:
ADMER AT 469 - based on waxy polyethylene, grafted with a maleic acid compound as described in U.S. Pat. No. 3,892,717, sold by the Mitsui Chemical Company.
PLEXAR 3026 and PLEXAR PX-3 - based on blends described in U.S. Pat. Nos. 4,087,587 and 4,087,588 sold by the Chemplex Company.
BYNEL CXA 3101 - maleic anhydride functionalized ethylene-vinyl acetate copolymers sold by the Dupont Company.

EXAMPLE 1

UV weatherability studies

Test samples were prepared by clamping a layer of polyarylate over a layer of natural polyethylene; the "laminated" structures were exposed to Atlas XW accelerated weathering. Three thicknesses of polyarylate were used. The results, shown in Table I, indicate that the polyarylate provides excellent UV protection to the polyethylene.

TABLE I

XW Weathering of Polyarylate Protected Polyethylene* Film

Tensile Break Elongation, %

| Exposure Time (hours) | Unprotected | Polyarylate Protected Thickness of Polyarylate Layer | | |
|---|---|---|---|---|
| | | 0.3–0.5 mil | 1 mil | 2 mil |
| Original | 680 | 600 | 680 | 680 |
| 600 | 310 | 725 | 700 | 700 |
| 1000 | 5.5 | 675 | 720 | 685 |
| 2000 | Brittle | 650 | 740 | 720 |

*Natural polyethylene film, 4 mil thick.

EXAMPLE 2

Coextrusion Experiments

Using three extruders (one for each component of the laminated structure) three-layer blown films were prepared. For both the polyethylene and the polyarylate, continuous taper, 2:1 compression ratio screws were used. Since polyethylene processes satisfactorily on this screw and the low 2:1 compression is needed for the polyarylate, this allowed interchangeability of resins between the two machines feeding the inner and the outer layers of the laminate. A conventional 3:1 feed-transition-metering screw was used for the tie layer.

Typical extrusion temperatures were:
225°–350° F. for the polyethylene;
about 500°–550° F. for the polyarylate; and
300°–350° F. for the tie layer.

The polyethylene used was USI NA 235-75. Because of the short distance (~7–8 ft.) between extrusion and bubble collapse, the polyarylate layer was on the inside; when the inner layer was polyethylene, bonding occurred upon bubble collapse, except at very low output rates.

The following was observed with respect to the tie materials:

PLEXAR 3026 produced a good bond, but the laminate was hazy;
PLEXAR PX-3 gave a transparent laminate, but the adhesion was only fair;
ADMER AT 469 and BYNEL CXA 3101 extruded very well through a die set at polyarylate temperatures (~500°–550° F.); bonds between the polyethylene and the polyarylate were excellent as was also the transparency.

Weatherability studies on the coextruded structures using the XW-Weatherometer are summarized in Table II. The data show that the laminates display vastly improved weatherability characteristics as compared to the polyethylene.

TABLE II

Laminated Coextruded Films - Tensile Properties After XW Weatherometer Exposure

| Properties | Polyarylate Side Exposed Tie Polymer | | Polyethylene Side Exposed | Polyethylene (No Polyarylate) |
|---|---|---|---|---|
| | ADMER AT 469 | BYNEL CXA 3101 | (BYNEL CXA 3101) | |
| No Exposure | | | | |
| Tensile Strength (psi) | 2820 | 2720 | — | 3340 |
| Elongation at break (%) | 150 | 165 | — | 550 |
| Yield Strength (psi) | 2550 | 2300 | — | 0 |
| Yield Elongation (%) | 12.0 | 14.3 | — | 0 |
| 1000 HRS. Exposure* | | | | |
| Tensile Strength (psi) | 2750 | 2610 | Brittle, cracked | Brittle, Cracked |
| Elongation at Break (%) | 750 | 650 | — | — |
| Yield Strength (psi) | 1930 | 2100 | — | — |
| Yield Elongation (%) | 4.8 | 4.8 | — | — |
| 300 HRS. Exposure | | | | |
| Appearance | Surface looks OK. Color is dull, light-green. | Same as with ADMER AT 469 | The polyethylene is all cracked off. Cracks also observed (transverse direction) in polyarylate which has a dull, light-green color. | The polyethylene is all cracked. |

*The polyarylate layer cracked-off during testing.

EXAMPLE 3

Polyethylene/Polyarylate Extrusion Without a Tie Layer

Using the technique of Example 2 a roll of film was made without the tie layer. Adhesion was sufficient for the layers to remain together during extrusion. However, the polyarylate and the polyethylene could be easily separated after cooling, allowing for accurate thickness measurement of each layer.

The quality of the polyarylate film after separation was found to be very good. The technique is a novel method for producing very thin (as thin as 0.1 mil) rigid films via extrusion. Usually, such films must be cast.

What is claimed is:

1. A laminated structure comprising a layer of a low density ethylene polymer or copolymer, a tie layer which is a maleic anhydride or maleic anhydride derivative functionalized polyethylene or polyethylene-vinyl acetate copolymer, and a layer of a polyarylate blend comprising a polyester of a dihydric phenol and an aromatic dicarboxylic acid and a poly(alkylene phthalate).

2. A laminated structure of claim 1 wherein the poly(alkylene phthalate) is at least one member selected from the group consisting of poly(ethylene terephthalate) and poly(butylene terephthalate).

3. The laminated structure of claim 1 wherein said layer of a low density ethylene polymer or copolymer has a thickness of from about 2 to 100 mils, said tie layer has a thickness of from about 0.3 to about 1.0 mils and said layer of a polyarylate blend has a thickness of from about 0.1 to about 4.0 mils.

4. The laminated structure of claim 1 wherein said polyester is a polyester of at least one dihydric phenol having the structure:

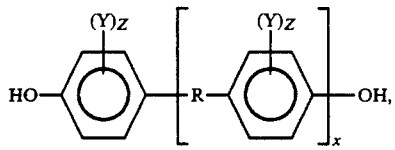

where Y is independently an alkyl group of one to four carbon atoms, chlorine or bromine; Z independently has a value of from 0 to 4; R is a divalent $C_6$ to $C_{20}$ aromatic or saturated aliphatic or cycloaliphatic radical, O, S, SO, $SO_2$, CO or a chemical bond; and x is 0 or 1.

5. The laminated structure of claim 1 wherein said polyester is a polyester of at least one dicarboxylic acid selected from the group consisting of terephthalic acid, isophthalic acid, napthalene dicarboxylic acids and the $C_1$ to $C_4$ alkyl, alkoxy and halo derivatives thereof.

6. The laminated structure of claim 1 wherein said ethylene polymer or copolymer is selected from the group of conventional low density polyethylenes (LDPE) jkmade under high pressure; LDPE copolymer incorporating other α-olefins; ethylene/vinyl acetate copolymers; linear low density polyethylenes (LLDPE); and the very low density ethylene copolymers with other α-olefins.

7. The laminated structure of claim 1 wherein said tie layer is a maleic anhydride functionalized ethylene-vinyl acetate copolymer having a melt index in the range of from about 0.8 to about 2.5 g/10 minutes and a Vicat softening point in the range of from about 60° to about 83° C.

8. The laminated structure of claim 1 wherein said tie layer is based on a low molecular weight ethylene polymer which is oxidized and subsequently grafted with a maleic acid compound and wherein said low molecular weight ethylene polymer is prepared in the presence of a titanium and/or a vanadium halogen compound as the catalyst.

9. The laminated structure of claim 8 wherein said maleic acid compound is selected from maleic acid, maleic anhydride and the $C_1$ to $C_8$ dialkyl esters of maleic acid.

* * * * *